US011784531B2

(12) United States Patent
Makino et al.

(10) Patent No.: US 11,784,531 B2
(45) Date of Patent: Oct. 10, 2023

(54) MOTOR HAVING AN ELECTRICAL DISCHARGING DEVICE AND COVER MEMBER

(71) Applicant: NIDEC CORPORATION, Kyoto (JP)

(72) Inventors: Takayuki Makino, Kyoto (JP); Tsubasa Hirayama, Kyoto (JP); Masahiro Kokubo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 46 days.

(21) Appl. No.: 17/676,819

(22) Filed: Feb. 22, 2022

(65) Prior Publication Data
US 2022/0271602 A1    Aug. 25, 2022

(30) Foreign Application Priority Data

Feb. 25, 2021  (JP) ................. 2021-028603
Jun. 30, 2021  (JP) ................. 2021-108486

(51) Int. Cl.
*H02K 5/10*      (2006.01)
*H02K 11/40*    (2016.01)
*H02K 7/00*      (2006.01)

(52) U.S. Cl.
CPC ............. *H02K 5/10* (2013.01); *H02K 7/003* (2013.01); *H02K 11/40* (2016.01); *H02K 2205/09* (2013.01)

(58) Field of Classification Search
CPC .... H02K 11/40; H02K 2205/09; H02K 7/003; H02K 5/10; H02K 7/116; H02K 7/08; H02K 5/225; H05F 3/04; H05F 3/02; H01T 19/00

USPC .................................................. 310/71, 40 R
See application file for complete search history.

(56) References Cited

U.S. PATENT DOCUMENTS 7,193,836 B2    3/2007  Oh et al.
11,088,582 B2   8/2021  Graves et al.
11,121,608 B2   9/2021  Huber et al.
(Continued)

FOREIGN PATENT DOCUMENTS

CN    108173386 A    6/2018
JP    2000316251 A    11/2000
JP    2001157394 A    6/2001
(Continued)

OTHER PUBLICATIONS

Makino et al.; "Motor and Drive Device"; U.S. Appl. No. 17/848,396, filed Jun. 24, 2022, 74pp.
(Continued)

*Primary Examiner* — Terrance L Kenerly
(74) *Attorney, Agent, or Firm* — HAUPTMAN HAM, LLP

(57) ABSTRACT

An electrical discharging device electrically connects a shaft of a motor and a housing. A plate portion of the housing has an opening through which the shaft is inserted and expands in a radial direction. A cover member is disposed on the plate portion and covers the electrical discharging device. A seal member is disposed between the shaft and the plate portion in the opening. The through hole is disposed in the plate portion and/or the cover member. The electrical discharging device is accommodated in an accommodation space surrounded by the plate portion and the cover member. The accommodation space is connected to the outside through the through hole.

15 Claims, 16 Drawing Sheets

(56) References Cited

U.S. PATENT DOCUMENTS

2010/0127585 A1*  5/2010  Fee .................. H02K 11/40
                                                         310/71
2013/0057096 A1   3/2013  Okada et al.

FOREIGN PATENT DOCUMENTS

JP          20104695 A    1/2010
JP        2019192491 A   10/2019

OTHER PUBLICATIONS

Shiraishi et al.; "Drive Device and Vehicle", U.S. Appl. No. 17/852,367, filed Jun. 29, 2022, 66pp.
Nakamura et al.; "Drive Device and Vehicle", U.S. Appl. No. 17/852,396, filed Jun. 29, 2022, 59pp.
Shimogai et al.; "Drive Device and Vehicle", U.S. Appl. No. 17/851,042, filed Jun. 28, 2022, 60pp.

* cited by examiner

MOTOR HAVING AN ELECTRICAL DISCHARGING DEVICE AND COVER MEMBER

CROSS-REFERENCE TO RELATED APPLICATIONS

The present invention claims priority under 35 U.S.C. § 119 to Japanese Patent Application No. 2021-028603 filed on Feb. 25, 2021 and Japanese Patent Application No. 2021-108486 filed on Jun. 30, 2021, the entire contents of which applications are incorporated herein by reference.

FIELD OF THE INVENTION

The present invention relates to a motor.

BACKGROUND

Conventionally, a technique of discharging a current of a shaft of a rotary machine such as a motor by a discharge device is known. For example, the discharge device has a contact formed of a molded carbon body. The contact is accommodated in a guide sleeve. The contact is established in electrical contact with a rotor contact surface formed on the peripheral edge of the shaft by the load exerted by the coil spring. The contact forms a conductive connection with the sleeve constituting the ground via the guide sleeve.

When the contact is brought into contact with the peripheral edge of the shaft, the contact is worn by the rotation of the shaft, and carbon wear debris is generated from the contact, for example. In order to prevent the wear debris from entering the inside of the housing of the rotary machine, it is necessary to seal between the shaft and the housing and to accommodate the discharge device in a space different from the inside of the housing.

When the discharge device is accommodated in the sealed space in order to prevent scattering of wear debris, the internal pressure changes due to a change in air temperature inside the space. If a pressure difference occurs between the inside and the outside of the space, sealing between the shaft and the housing may not be maintained.

SUMMARY

An exemplary motor of the present invention includes a shaft, a rotor, a stator, a housing, and an electrical discharging device. The shaft extends in the axial direction along the rotation axis. The rotor is supported by the shaft and rotatable together with the shaft. The stator is disposed radially outward of the rotor. The housing accommodates the rotor and the stator. The electrical discharging device electrically connects the shaft and the housing. The housing includes a plate portion, a cover member, a seal member, and a through hole. The plate portion has an opening through which one axial end portion of the shaft is inserted and expands in the radial direction. The cover member is disposed in one axial end surface of the plate portion and covers the electrical discharging device. The seal member is disposed between the shaft and the plate portion in the opening. The through hole is disposed in at least one of the plate portion and the cover member. The electrical discharging device is accommodated in an accommodation space surrounded by the plate portion and the cover member. The accommodation space is connected to the outside through the through hole.

The above and other elements, features, steps, characteristics and advantages of the present disclosure will become more apparent from the following detailed description of the preferred embodiments with reference to the attached drawings.

DETAILED DESCRIPTION

Hereinafter, exemplary embodiments will be described with reference to the drawings.

Figure 1:
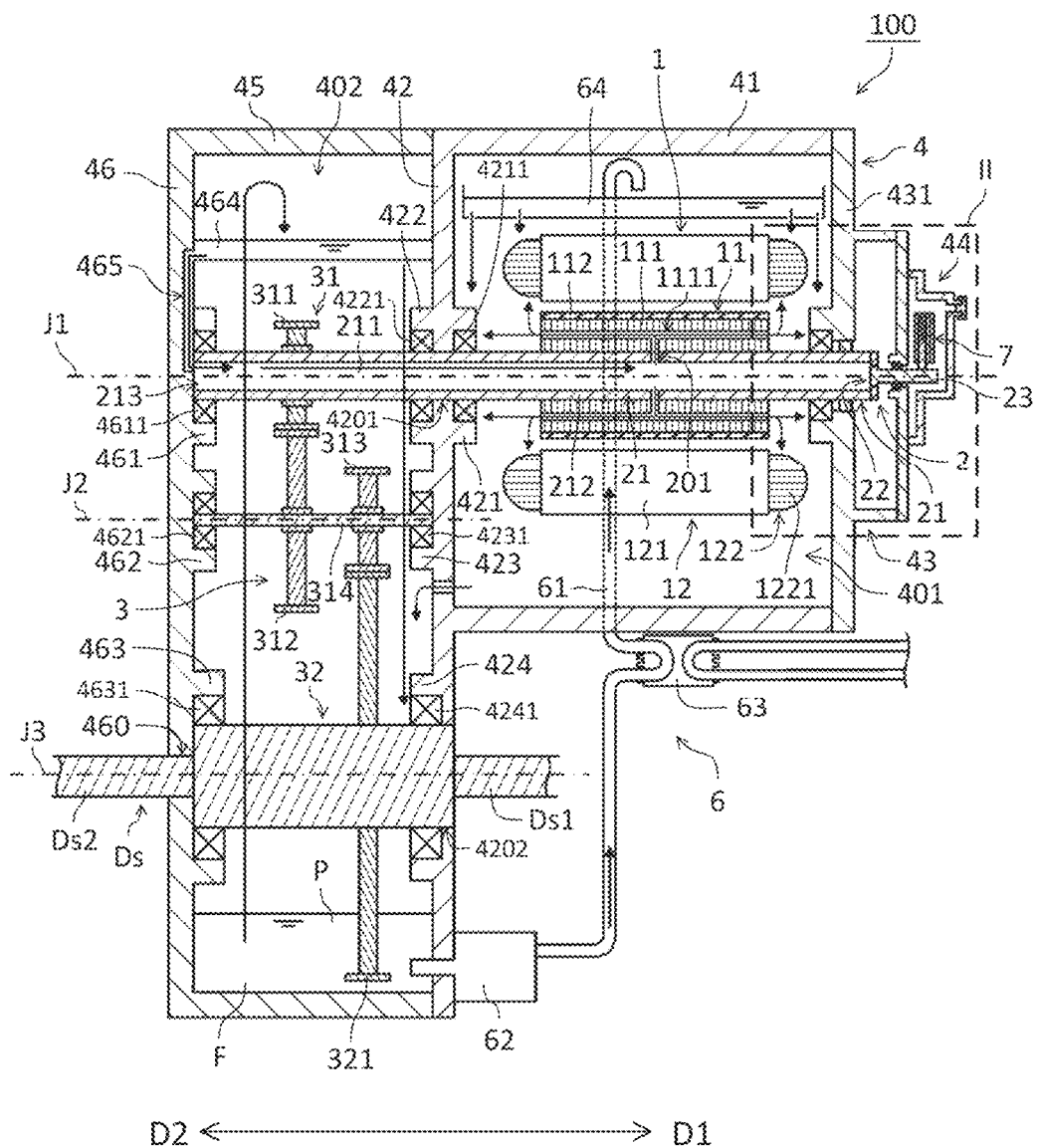
FIG. 1 is a conceptual diagram illustrating a configuration example of a motor.

In the present specification, a direction parallel to a first rotation axis J1 of a motor 100 is referred to as an "axial direction" of a motor unit 1. In the axial direction, as illustrated in FIG. 1, a motor unit 1 side is defined as one axial side D1, and a power transmission device 3 side is defined as the other axial side D2. In addition, a radial direction orthogonal to a predetermined axis is simply referred to as a "radial direction", and a circumferential direction around the predetermined axis is simply referred to as a "circumferential direction". The "direction parallel to the rotation axis" described in the present specification includes not only a case where the direction is completely parallel to the rotation axis, but also a case where the direction is substantially parallel to the rotation axis. Then, "extending along" a predetermined direction or a plane includes not only a case of extending strictly in a predetermined direction but also a case of extending in a direction inclined within a range of less than 45° with respect to the exact direction.

Figure 2:
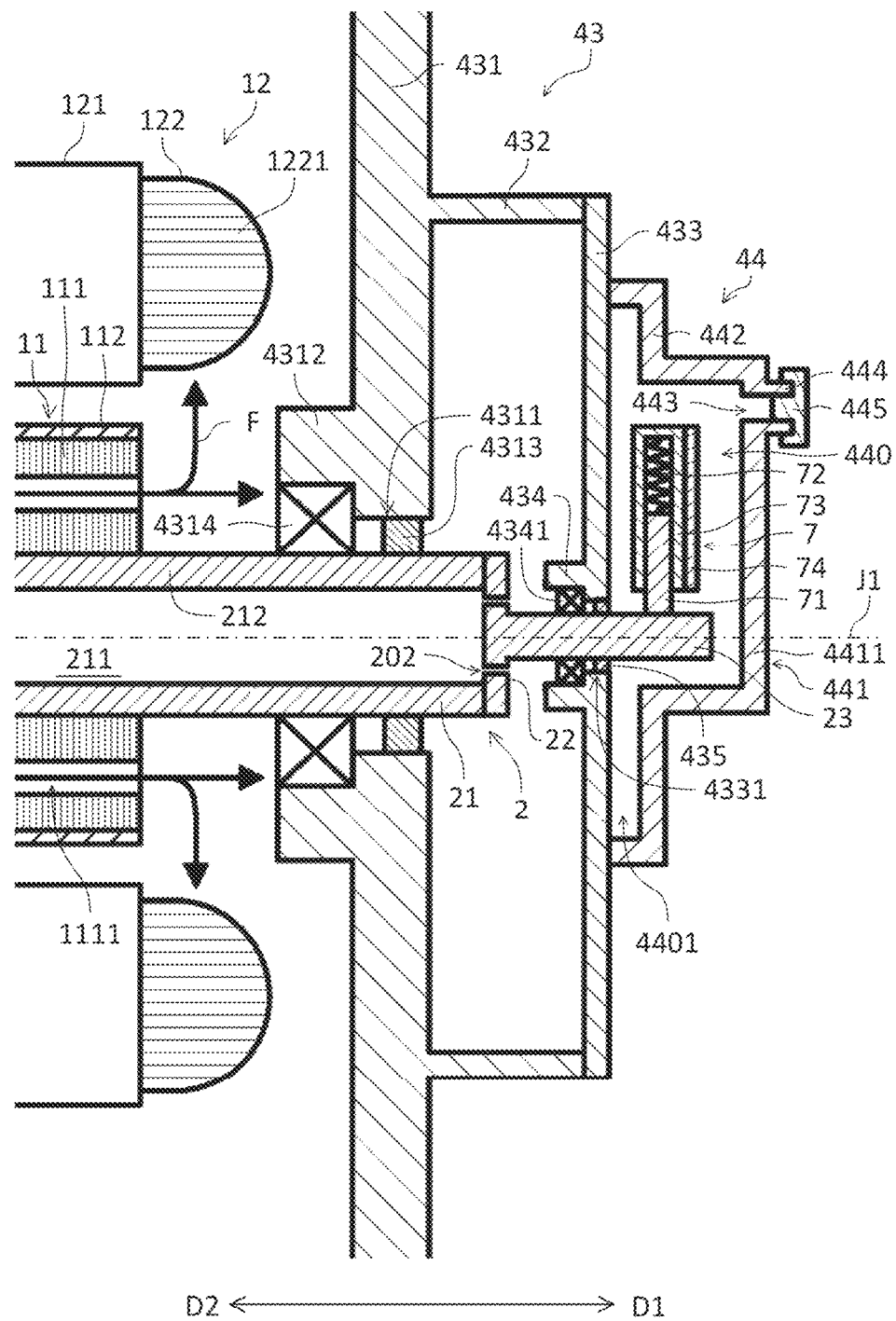
FIG. 2 is a conceptual diagram illustrating an enlarged configuration example of a main part of the motor.
Figure 3:
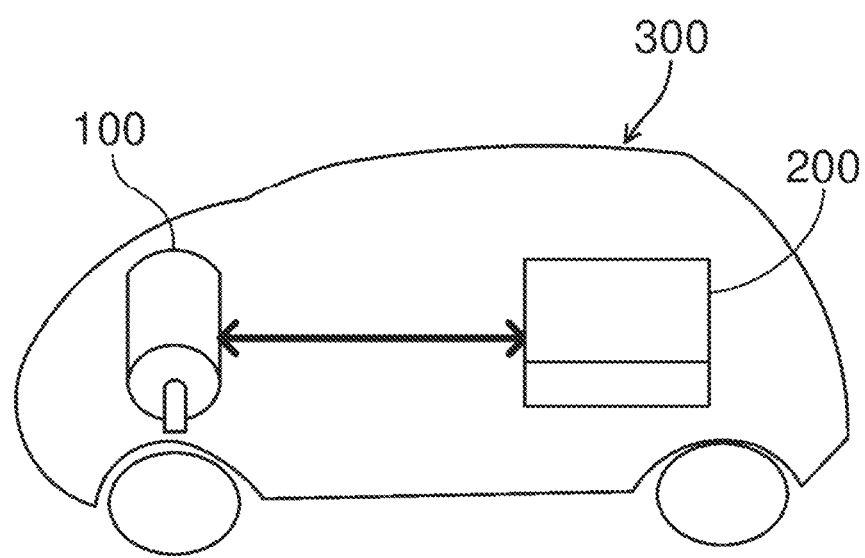
FIG. 3 is a schematic diagram illustrating an example of a vehicle on which the motor is mounted.

FIG. 1 is a conceptual diagram illustrating a configuration example of the motor 100. FIG. 2 is a conceptual diagram illustrating an enlarged configuration example of a main part of the motor 100. FIG. 3 is a schematic diagram illustrating an example of a vehicle 300 including the motor 100. Note that FIGS. 1 and 2 are merely the conceptual diagrams, and a layout and a dimension of each unit are not necessarily identical to a layout and a dimension of each unit of the actual motor 100. FIG. 2 is an enlarged view of a portion II encircled by a broken line in FIG. 1. Note that FIG. 3 conceptually illustrates the vehicle 300.

As illustrated in FIG. 3, in the present embodiment, the motor 100 is mounted on the vehicle 300 such as a hybrid vehicle (HV), a plug-in hybrid vehicle (PHV), and an electric vehicle (EV) in which at least the motor is used as a power source. The motor 100 is used as the power source of the above-described vehicle 300. The vehicle 300 includes the motor 100 and a battery 200. The battery 200 stores electric power to be supplied to the motor 100. In the example of the vehicle 300, the motor 100 drives the right and left front wheels. Note that the motor 100 only has to drive at least one of the wheels.

As illustrated in FIG. 1, the motor 100 includes a motor unit 1, a shaft 2, a power transmission device 3, a housing 4, and a fluid circulation portion 6. The shaft 2 extends in the axial direction along a first rotation axis J1 parallel to the horizontal direction. The shaft 2 is rotatable about the first rotation axis J1. The housing 4 accommodates the motor unit 1, the shaft 2, and the power transmission device 3. For example, the housing 4 accommodates a rotor 11, a stator 12, and the like of the motor unit 1 described later.

The motor 100 further includes an electrical discharging device 7. The electrical discharging device 7 electrically connects the shaft 2 and the housing 4. The electrical discharging device 7 is fixed to the housing 4 and is in contact with the shaft 2. As illustrated in FIG. 2, the electrical discharging device 7 of the present embodiment further includes a conductive member 71, an elastic member 72, a holding member 73, and a fixing member 74.

The conductive member 71 is formed using a material having conductivity. A tip of the conductive member 71 is in contact with a second shaft 23 of the shaft 2 described later. The conductive member 71 has a brush shape in the present embodiment, but is not limited to this example, and may be a molded body. As the material of the conductive member 71, a material having good slidability is preferably used, and a material having a low friction coefficient is more preferably used. As a material of the conductive member 71, for example, a composite resin containing a conductive filler such as carbon fiber or metal can be adopted.

The elastic member 72 is accommodated inside the holding member 73 in a compressed state. Due to the elasticity, the elastic member 72 pushes the conductive member 71 toward the second shaft 23. In the present embodiment, a spring coil is used as the elastic member 72, but the present invention is not limited to this example, and a member in another form such as a leaf spring or rubber may be used.

The holding member 73 has a bottomed tubular shape, and accommodates a part of the conductive member 71 and the elastic member 72 therein. The holding member 73 holds the conductive member 71. Specifically, the holding member 73 holds the end portion of the conductive member 71 on the elastic member 72 side so as to be movable in the direction in which the holding member 73 extends. The holding member 73 holds the elastic member 72 so as to be stretchable in the direction in which the holding member 73 extends.

The fixing member 74 fixes the electrical discharging device 7 to the housing 4. In the present embodiment, the fixing member 74 is attached to the holding member 73. At least one fixing member 74 is fixed to a plate portion 433 described later (see FIG. 4 described later). However, the present invention is not limited to this example, and at least one fixing member 74 may be fixed to a cover member 44 described later. That is, the fixing member 74 fixes the holding member 73 to at least one of the plate portion 433 and the cover member 44.

Further, the fixing member 74 has conductivity and is electrically connected to the conductive member 71. When the fixing member 74 is fixed to the plate portion 433 or the cover member 44 having conductivity, the conductive member 71 is electrically connected to the housing 4.

Next, the motor unit 1 will be described with reference to FIGS. 1 and 2. The motor unit 1 is a DC brushless motor. The motor unit 1 is a drive source of the motor 100, and is driven by power from an inverter (not illustrated). That is, the motor unit 1 is an inner rotor type motor in which the rotor 11 is rotatably disposed inward of the stator 12. As illustrated in FIG. 1, the motor unit 1 includes the rotor 11 and the stator 12.

The rotor 11 is supported to the shaft 2. The motor 100 includes the rotor 11. The rotor 11 is rotatable together with the shaft 2. Specifically, the rotor 11 is supported by a first shaft 21 described later. The rotor 11 rotates when electric power is supplied from a power source unit (not illustrated) of the motor 100 to the stator 12. The rotor 11 includes a rotor core 111 and a magnet 112. The rotor core 111 is formed by stacking electromagnetic steel plates having a thin plate shape, for example. The rotor core 111 is a cylindrical body extending along the axial direction, and is fixed to the radially outer surface of the first shaft 21. A plurality of magnets 112 are fixed to the rotor core 111. The plurality of magnets 112 are aligned along the circumferential direction with the magnetic poles arranged alternately.

The rotor core 111 has a rotor through hole 1111. The rotor through hole 1111 penetrates the rotor core 111 in the axial direction and is connected to a first shaft through hole 201. The rotor through hole 1111 is used as a flow path of a fluid F. In the present embodiment, the fluid F is a lubricant that lubricates each bearing of the motor 100, the power transmission device 3, and the like, and is, for example, oil such as automatic transmission fluid (ATF). The motor 100 includes the fluid F. The fluid F is also used as a refrigerant for cooling the stator 12 and bearings 4211 and 4314 described later.

When the rotor 11 rotates, the fluid F flowing through the hollow portion 211 of the first shaft 21 can flow into the rotor through hole 1111 via the first shaft through hole 201. The fluid F flowing into the rotor through hole 1111 can flow out of the rotor core 111 from both axial ends of the rotor through hole 1111. The flown fluid F flies toward the stator 12 and cools, for example, the coil portion 122 (particularly, the coil end 1221). In addition, the flowed fluid F flies toward the bearings 4211 and 4314 that rotatably support the first shaft 21, and the like, and lubricates and cools the bearings 4211 and 4314.

The stator 12 is disposed radially outward of the rotor 11. The motor 100 includes the stator 12. The stator 12 includes a stator core 121 and the coil portion 122. The stator 12 is held by a first housing tubular portion 41 described later. The stator core 121 has a plurality of magnetic pole teeth (not illustrated) extending radially inward from an inner peripheral surface of an annular yoke. The coil portion 122 is formed by winding a conductive wire around magnetic pole teeth via an insulator (not illustrated). The coil portion 122 includes the coil end 1221 protruding from the axial end surface of the stator core 121.

As illustrated in FIGS. 1 and 2, the shaft 2 is rotatably supported by the housing 4 via bearings 4211, 4221, 4314, and 4611 described later. That is, the motor 100 includes the bearings 4211, 4221, 4314, and 4611. The bearings 4211, 4221, 4314, and 4611 rotatably support the first shaft 21.

The shaft 2 includes the first shaft 21. As described above, the motor 100 includes the shaft 2. The first shaft 21 has an axially extending tubular shape. The refrigerant flows inside the first shaft 21. The motor 100 further includes the refrigerant. The refrigerant is the fluid F in the present embodiment. According to the rotation of the shaft 2, the refrigerant flowing inside the first shaft 21 can be supplied to the stator 12, the bearings 4211 and 4314, and the like through the first shaft through hole 201 described later. Therefore, the stator 12 (particularly, the coil end 1221 of the coil portion 122), the bearings 4211 and 4314, and the like can be cooled by the refrigerant.

The first shaft 21 includes a hollow portion 211, a shaft tubular portion 212, and an inlet 213. The shaft tubular portion 212 extends in the axial direction along the first rotation axis J1. The hollow portion 211 is disposed inside the shaft tubular portion 212. The inlet 213 is disposed on the other axial side D2 of the shaft tubular portion 212 and is connected to an oil passage 465 of a gear lid portion 46 described later. The fluid F described later flows into the hollow portion 211 from the oil passage 465 through the inlet 213.

Note that the first shaft 21 may be dividable at an intermediate portion in the axial direction. When the first shaft 21 is dividable, the divided first shafts 21 are connected by spline fitting, for example. Alternatively, a screw coupling using a male screw and a female screw may be employed. Alternatively, the divided power shafts may be joined by a fixing method such as press-fitting or welding. When the fixing method such as press-fitting or welding is adopted, serrations combining recesses and protrusions extending in the axial direction may be adopted. With such a configuration, it is possible to reliably transmit the rotation.

The shaft 2 further includes a lid portion 22, a second shaft 23, a first shaft through hole 201, and a second shaft through hole 202. The lid portion 22 is disposed in one axial end portion of the first shaft 21. The second shaft 23 extends from the lid portion 22 on the one axial side D1. The first shaft through hole 201 penetrates the first shaft 21 in the radial direction. The second shaft through hole 202 communicates with the inside of the first shaft 21 and the external space of the shaft 2. The second shaft through hole 202 is disposed on the one axial side D1 with respect to the first shaft through hole 201. The first shaft 21, the lid portion 22, and the second shaft 23 have conductivity, and are made of metal in the present embodiment. The second shaft 23 is in contact with the electrical discharging device 7.

The second shaft 23 extends in the axial direction along the first rotation axis J1. The second shaft 23 is an example of a "shaft" of the present invention. The outer diameter of the second shaft 23 is smaller than the outer diameter of the first shaft 21. The electrical discharging device 7 is in contact with the second shaft 23. In the present embodiment, the electrical discharging device 7 is in contact with the radially outer surface of the second shaft 23, but is not limited to this example, and may be in contact with one axial end surface of the second shaft 23.

The first shaft through hole 201 is disposed in the shaft tubular portion 212 and penetrates the shaft tubular portion 212 in the radial direction. When the shaft 2 rotates, the fluid F in the first shaft 21 flows out from the hollow portion 211 to the outside of the first shaft 21 through the first shaft through hole 201 by centrifugal force. In the present embodiment, as illustrated in FIG. 1, the first shaft through hole 201 is disposed on the other axial side D2 with respect to the one axial end portion of the rotor 11 and on the one axial side D1 with respect to the other axial end portion of the rotor 11, and is connected to the rotor through hole 1111 as described above.

However, the present invention is not limited to the example of FIG. 1, and the first shaft through hole 201 may be disposed on the one axial side D1 with respect to the one axial end portion of the rotor 11, or may be disposed on the other axial side D2 with respect to the other axial end portion of the rotor 11. That is, at least some of the first shaft through holes 201 may be disposed in at least one of these positions.

The second shaft through hole 202 is disposed in at least one of the lid portion 22 and the shaft tubular portion 212. In the present embodiment, the second shaft through hole 202 is disposed in the lid portion 22 and penetrates the lid portion 22 in the axial direction (see, for example, FIG. 2). Thus, air is more easily sucked into the first shaft 21 than when the second shaft through hole 202 is disposed in the first shaft 21. In addition, if the number of the second shaft through holes 202 functioning as the intake ports is plural, the amount of intake air into the first shaft 21 and the flow of the intake air flow can be appropriately adjusted according to the number and arrangement of the second shaft through holes 202. However, the present invention is not limited to the above example, and the second shaft through hole 202 may be disposed in the first shaft 21 and penetrate the first shaft 21 in the radial direction.

The number of the second shaft through holes 202 may be one or plural. In the latter case, the second shaft through holes 202 can be arranged at equal intervals or different intervals in the circumferential direction.

In the present embodiment, as illustrated in FIG. 2, the lid portion 22 has a plate shape expanding in the radial direction from the first rotation axis J1. However, the present invention is not limited to this example, and the shape of the lid portion 22 may be a shape other than the plate shape, and for example, or may be a conical shape expanding radially outward toward the one axial side D1 or the other axial side D2.

Next, details of the power transmission device 3 will be described with reference to FIG. 1. The power transmission device 3 transmits the power of the motor unit 1 to the output shaft Ds. The power transmission device 3 includes a speed reduction device 31 and a differential device 32.

The speed reduction device 31 is connected to the shaft 2. The speed reduction device 31 has a function of reducing the rotation speed of the motor unit 1 and increasing torque output from the motor unit 1 according a reduction ratio. The speed reduction device 31 transmits the torque output from the motor unit 1 to the output shaft Ds. That is, the power transmission device 3 is connected to the other axial side D2 of the shaft 2 that rotates about the first rotation axis J1 extending along the horizontal direction.

The speed reduction device 31 includes a main drive gear 311, an intermediate driven gear 312, a final drive gear 313, and an intermediate shaft 314. The torque output from the motor unit 1 is transmitted to a ring gear 321 of the output shaft Ds via the shaft 2, the main drive gear 311, the intermediate driven gear 312, the intermediate shaft 314, and the final drive gear 313.

The main drive gear 311 is disposed on the outer peripheral surface of the shaft 2. The main drive gear 311 may be the same member as the shaft 2, or may be another member and be firmly fixed. The main drive gear 311 rotates about the first rotation axis J1 together with the shaft 2.

The intermediate shaft 314 is arranged to extend along a second rotation axis J2 parallel to the first rotation axis J1. Both ends of the intermediate shaft 314 are rotatably supported about the second rotation axis J2 by a first intermediate bearing 4231 and a second intermediate bearing 4621. The intermediate driven gear 312 and the final drive gear 313 are disposed on an outer peripheral surface of the intermediate shaft 314. The intermediate driven gear 312 may be the same member as the intermediate shaft 314, or may be another member and be firmly fixed.

The intermediate driven gear 312 and the final drive gear 313 rotate integrally with the intermediate shaft 314 about the second rotation axis J2. The intermediate driven gear 312 meshes with the main drive gear 311. The final drive gear 313 meshes with the ring gear 321 of the output shaft Ds.

The torque of the shaft 2 is transmitted from the main drive gear 311 to the intermediate driven gear 312. The torque transmitted to the intermediate driven gear 312 is transmitted to the final drive gear 313 via the intermediate shaft 314. Furthermore, the torque is transmitted from the final drive gear 313 to the output shaft Ds.

The differential device 32 is attached to the output shaft Ds. The differential device 32 includes the ring gear 321. The ring gear 321 transmits the output torque of the motor unit 1 to the output shaft Ds. The output shaft Ds has axles Ds1 and Ds2 respectively attached to the left and right of the differential device 32. For example, the differential device 32 transmits torque to the left and right axles Ds1 and Ds2 while absorbing the rotational speed difference between the left and right axles when the vehicle turns.

The lower end portion of the ring gear 321 is disposed inside a fluid storage portion P described later in which the fluid F stored in the lower portion of the gear portion accommodation space 402 is stored (see FIG. 1). Thus, when the first gear 331 rotates, the fluid F is scraped up by gear teeth of the ring gear 321. The respective gears and bearings of the power transmission device 3 are lubricated or cooled by the fluid F scraped up by the ring gear 321. A part of the scraped fluid F is stored in a tray portion 464 described later, and is also used for cooling the motor unit 1 via the shaft 2.

Next, details of the housing 4 will be described with reference to FIGS. 1 and 2. The housing 4 includes a first housing tubular portion 41, a side plate portion 42, a motor lid portion 43, a cover member 44, a second housing tubular portion 45, and a gear lid portion 46. The first housing tubular portion 41, the side plate portion 42, the motor lid portion 43, the second housing tubular portion 45, and the gear lid portion 46 are formed using, for example, a conductive material, and in the present embodiment, are formed using a metal material such as iron, aluminum, or an alloy thereof. In addition, in order to suppress contact corrosion of dissimilar metals at the contact portion, these are preferably formed using the same material. However, the present invention is not limited to this example, and these materials may be formed using materials other than metal materials, or at least a part of these materials may be formed using different materials.

As described above, the housing 4 accommodates the rotor 11, the stator 12, the bearings 4211 and 4314, and the like of the motor unit 1. Specifically, the housing 4 has a motor accommodation space 401. The motor accommodation space 401 is a space surrounded by the first housing tubular portion 41, the side plate portion 42, and the motor lid portion 43, and accommodates the rotor 11, the stator 12, the bearings 4211 and 4314, and the like.

The housing 4 accommodates the power transmission device 3. Specifically, the housing 4 includes the gear portion accommodation space 402. The gear portion accommodation space 402 is a space surrounded by the side plate portion 42, the second housing tubular portion 45, and the gear lid portion 46, and accommodates the speed reduction device 31, the differential device 32, and the like.

The fluid storage portion P in which the fluid F is stored is disposed in a lower portion in the gear portion accommodation space 402. A portion of the differential device 32 soaks in the fluid storage portion P. The fluid F stored in the fluid storage portion P is scraped up by the operation of the differential device 32 and supplied to the inside of the gear portion accommodation space 402. That is, the fluid F is scraped up by a tooth surface of the ring gear 321 when the ring gear 321 of the differential device 32 rotates. A part of the scraped fluid F is supplied to each gear and each bearing of the speed reduction device 31 and the differential device 32 in the gear portion accommodation space 402 and used for lubrication. In addition, another part of the scraped fluid F is supplied to the inside of the shaft 2, and is supplied to the rotor 11 and the stator 12 of the motor unit 1 and each bearing in the gear portion accommodation space 402 to be used for cooling and lubrication.

The first housing tubular portion 41 has a tubular shape that extends in the axial direction. The motor unit 1, a reservoir 64 described later, and the like are disposed inside the first housing tubular portion 41. The stator core 121 is fixed to the inner surface of the first housing tubular portion 41.

The side plate portion 42 extends in a direction perpendicular to the first rotation axis J1 and covers the other axial end portion of the first housing tubular portion 41. In the present embodiment, the first housing tubular portion 41 and the side plate portion 42 are different parts of a single member. By integrally forming both of them, rigidity of them can be enhanced. However, the present invention is not limited to this example, and the first housing tubular portion 41 and the side plate portion 42 may be separate members.

The side plate portion 42 has a side plate through hole 4201 through which the shaft 2 is inserted and a first output shaft through hole 4202. The side plate through hole 4201 and the first output shaft through hole 4202 penetrates the side plate portion 42 in the axial direction. The first shaft 21 is inserted into the side plate through hole 4201. One axle Ds1 of the output shaft Ds is inserted into the first output shaft through hole 4202. An oil seal (not illustrated) is disposed in a gap between the output shaft Ds and the first output shaft through hole 4202 to seal both. The term "seal" means that different members are in close contact with each other to such an extent that the fluid F inside the members does not leak to the outside and to such an extent that foreign matters such as external water, dust, and dust do not enter. The same applies for sealing.

The side plate portion 42 further includes bearing holding portions 421, 422, 423, and 424. The bearing holding portion 421 is disposed on one axial end surface of the side plate portion 42 in the motor accommodation space 401 and holds the bearing 4211. The bearing holding portions 422, 423, and 424 are disposed on the other axial end surface of the side plate portion 42 in the gear portion accommodation space 402 described later. The bearing holding portion 422 is disposed along the outer edge portion of the other axial end portion of the side plate through hole 4201 and holds the bearing 4211. The bearing holding portion 423 holds the first intermediate bearing 4231. The bearing holding portion 424 is disposed along the outer edge portion of the other axial end portion of the first output shaft through hole 4202 and holds a first output bearing 4241.

The motor lid portion 43 is attached to one axial end portion of the first housing tubular portion 41. The motor lid portion 43 can be fixed to the first housing tubular portion 41 by, for example, a screw, but is not limited thereto, and a method of firmly fixing the plate portion 433 to the first housing tubular portion 41, such as screwing or press-fitting, can be widely adopted. As a result, the motor lid portion 43 can be brought into close contact with one axial end portion of the first housing tubular portion 41. The term "close contact" means sealability to an extent that the fluid F inside the member does not leak to the outside and to an extent that foreign matters such as external water, dirt, and dust do not enter. The same applies for adhesion.

As illustrated in FIG. 2, the motor lid portion 43 includes a lid portion 431, a tubular portion 432, a plate portion 433, and a bearing holding portion 434. In other words, the housing 4 includes the lid portion 431, the tubular portion 432, and the plate portion 433.

The lid portion 431 extends in a direction intersecting the first rotation axis J1 and covers one axial end portion of the first housing tubular portion 41. The lid portion 431 includes an opening 4311 through which the shaft 2 is inserted. The opening 4311 penetrates the lid portion 431 in the axial direction. The first shaft 21 is inserted into the opening 4311. The lid portion 431 further includes a bearing holding portion 4312 and a seal member 4313. The bearing holding portion 4312 is disposed on the other axial end surface of the lid portion 431 in the motor accommodation space 401. The bearing holding portion 4312 is disposed along an outer edge portion of the other axial end portion of the opening 4311 and holds the bearing 4314. The seal member 4313 is disposed between the first shaft 21 and the lid portion 431 in the opening 4311 to seal both. By sealing the opening 4311 with the seal member 4313, for example, foreign matter such as wear debris generated in the electrical discharging device 7 can be prevented from entering the motor accommodation space 401 in which the stator 12 and the like are accommodated through the opening 4311.

The tubular portion 432 has a tubular shape surrounding the first rotation axis J1 and extends on the one axial side D1 from the one axial end surface of the lid portion 431.

The plate portion 433 has conductivity, extends in a direction intersecting the first rotation axis J1 and is attached to the one axial end portion of the tubular portion 432. As mentioned earlier, the housing 4 includes the plate portion 433. In the present embodiment, the plate portion 433 has an opening 4331 through which the second shaft 23 of the shaft 2 is inserted and expands in the radial direction. Specifically, the plate portion 433 is disposed on the one axial side D1 with respect to the stator 12 and the bearing 4341 described later. The opening 4331 is disposed in the plate portion 433. The opening 4331 penetrates the plate portion 433 in the axial direction. The electrical discharging device 7 is disposed in one axial end portion of the plate portion 433.

The plate portion 433 further includes a fixing portion 4332, a rib 4333, and a wall portion 4334. The fixing portion 4332 and the rib 4333 protrude from the plate portion 433 in the one axial side D1. The fixing member 74 of the electrical discharging device 7 is fixed to the fixing portion 4332. For each fixing portion 4332, the plurality of ribs 4333 radially extend from the fixing portion 4332. An end portion of each rib 4333 on the fixing portion 4332 side is connected to the outer surface of the fixing portion 4332. The wall portion 4334 is disposed between the second shaft 23 of the shaft 2 and a through hole 443 described later when viewed from the axial direction.

The bearing holding portion 434 is disposed along an outer edge portion of one axial end portion of the opening 4331 on the other axial end surface of the plate portion 433 and holds the bearing 4341.

The seal member 435 is disposed in the opening 4331 of the plate portion 433. The motor 100 includes an annular seal member 435. The seal member 435 is disposed between the second shaft 23 and the plate portion 433 in the opening 4331 to seal both. The radially inner end portion along the outer edge portion of the opening 4331 of the plate portion 433 is in contact with the radially outer surface of the second shaft 23 of the shaft 2 via the seal member 435. The radially outer end portion of the seal member 435 is in contact with the inner peripheral surface of the opening 4331 facing radially inward. The radially inner end portion of the seal member 435 is in contact with the radially outer surface of the second shaft 23. By sealing the opening 4331 with the seal member 435, it is possible to prevent wear debris generated from the electrical discharging device 7 disposed in one axial end surface of the plate portion 433 from entering the other axial side D2 with respect to the plate portion 433 through the opening 4331. Therefore, wear debris can be prevented from entering the inside of the housing 4 in which the stator 12 and the like are accommodated. For example, wear debris can also be prevented from entering the hollow portion 211 of the first shaft 21 via the second shaft through hole 202. Therefore, wear debris can be prevented from entering the motor accommodation space 401 along with the flow of the fluid F in the hollow portion 211.

The cover member 44 is disposed in one axial end surface of the plate portion 433. As mentioned earlier, the housing 4 includes the cover member 44. The cover member 44 covers the electrical discharging device 7. That is, the electrical discharging device 7 is accommodated in the accommodation space 440 surrounded by the plate portion 433 and the cover member 44. The wear debris of the conductive member 71 generated in the contact portion between the second shaft 23 of the shaft 2 and the conductive member 71 can be accommodated in the accommodation space 440. Therefore, the wear debris can be prevented from scattering to the outside of the accommodation space 440.

In addition, the accommodation space 440 includes a lower space 4401 having a predetermined size. The lower space 4401 is disposed vertically below the opening 4331 of the plate portion 433. Thus, wear debris generated at the contact portion between the second shaft 23 of the shaft 2 and the electrical discharging device 7 can be stored in the lower space 4401. By making the lower space 4401 sufficiently wide, the wear debris accumulated in the lower portion of the accommodation space 440 can be prevented from overflowing between the second shaft 23 and the plate portion 433 in the opening 4331.

Attachment of the cover member 44 to the plate portion 433 may be, for example, screwing, but is not limited thereto. In the present embodiment, the cover member 44 forms an accommodation space 440 together with the plate portion 433. The accommodation space 440 is a space surrounded by the cover member 44 and the plate portion 433, and accommodates the opening 4331 and the electrical discharging device 7.

The cover member 44 includes a first cover portion 441 and a second cover portion 442. The first cover portion 441 covers the electrical discharging device 7. The second cover portion 442 is disposed radially outward of the first cover portion 441. Specifically, the first cover portion 441 and the second cover portion 442 spread in a direction intersecting the first rotation axis J1. The first cover portion 441 is disposed on the one axial side D1 with respect to the opening 4331 and the electrical discharging device 7. The first cover portion 441 includes a plate portion 4411 that expands in a direction intersecting the first rotation axis J1. The second cover portion 442 is disposed on the other axial side D2 with respect to the first cover portion 441. The radially inner end portion of the second cover portion 442 is connected to the radially outer end portion of the first cover portion 441, and the radially outer end portion of the second cover portion 442 is connected to one axial end surface of the plate portion 433. The lower space 4401 is disposed between the plate portion 433 and the second cover portion 442. Thus, since the second cover portion 442 is disposed on the other axial side D2 with respect to the first cover portion 441, the space of the housing 4 can be saved in the axial direction. In addition, a part of the space between the plate portion 433 and the second cover portion 442 can be used as the lower space 4401 in which wear debris is accumulated.

In the present embodiment, the cover member 44 further includes a through hole 443, a tubular portion 444, and a filter 445. Here, the through hole 443, the tubular portion 444, and the filter 445 will be described with reference to FIGS. 2 and 4 to 14.

Figure 4:
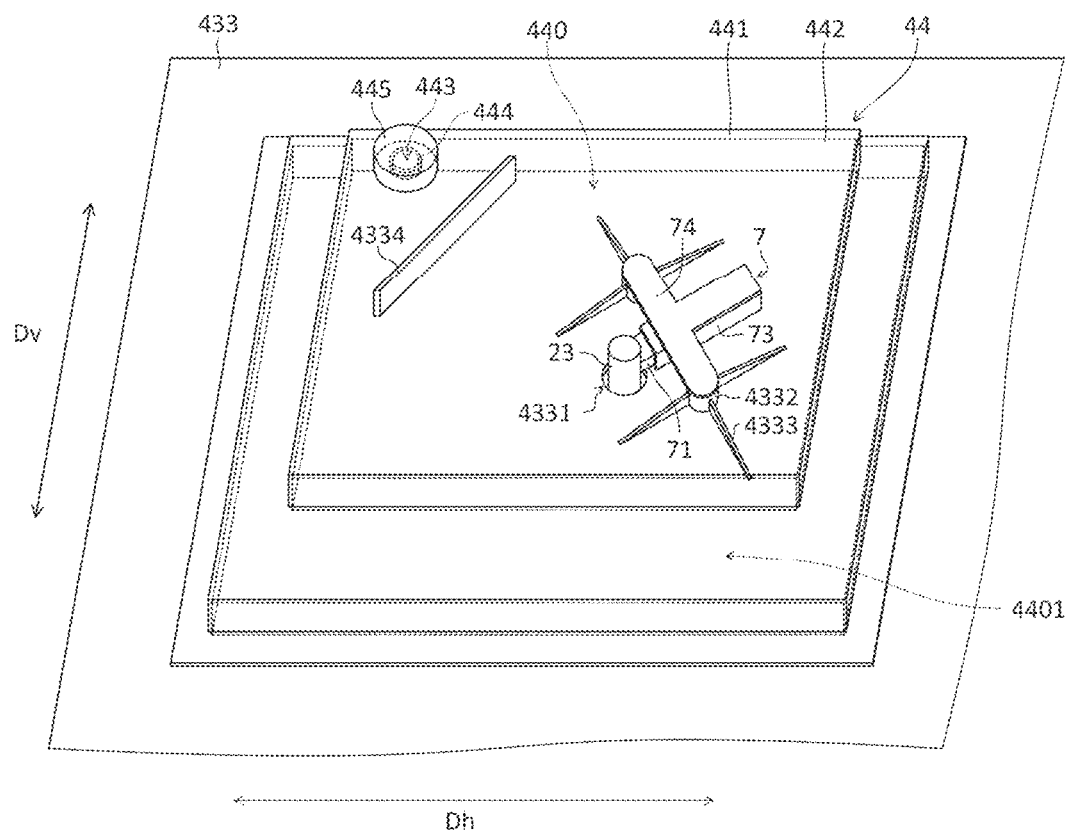
FIG. 4 is a perspective view illustrating a configuration example of a cover member and an inside of the cover member.
Figure 5:
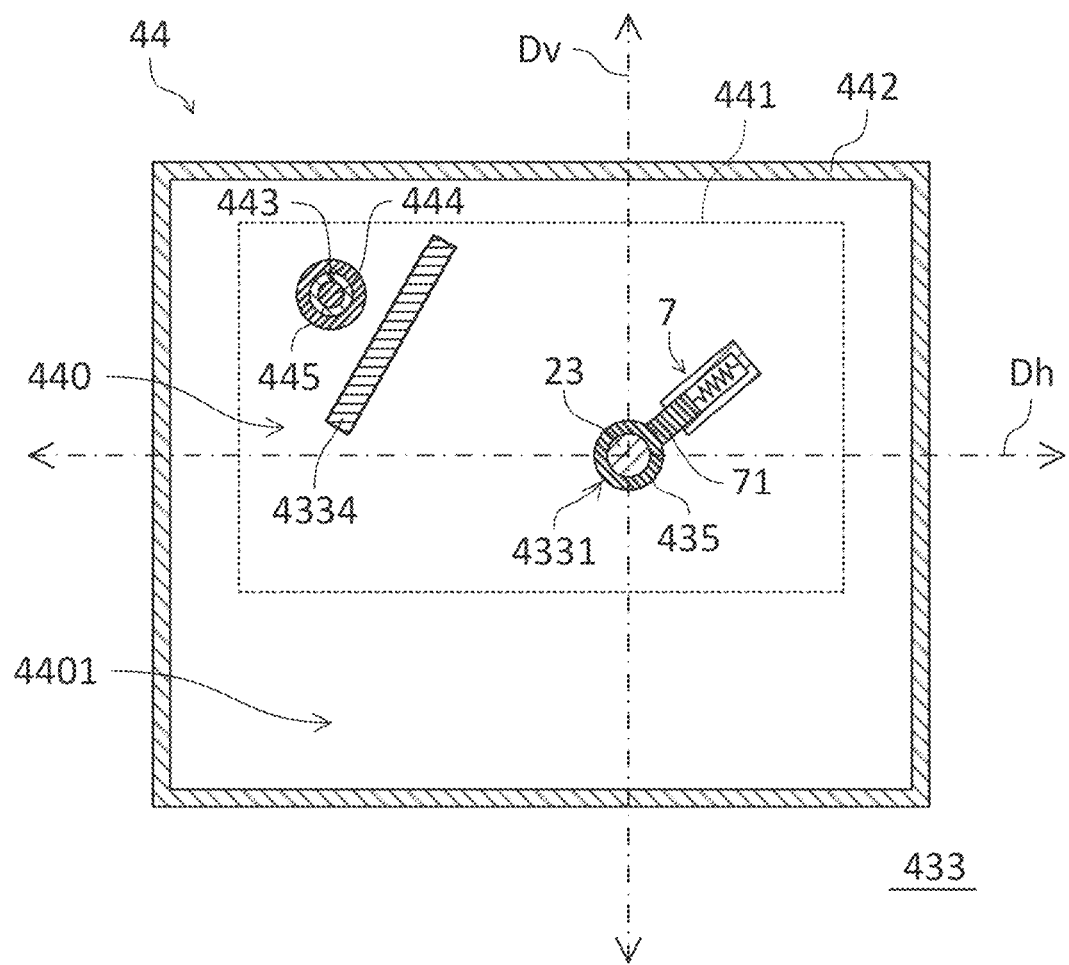
FIG. 5 is a sectional view of the cover member and the inside of the cover member when viewed from an axial direction.

FIG. 4 is a perspective view illustrating a configuration example of the cover member 44 and the inside thereof. FIG. 5 is a sectional view of the cover member 44 and the inside thereof when viewed from the axial direction. In FIG. 4, the cover member 44 is displayed in a transparent manner for easy viewing of the arrangement of the second shaft 23, the electrical discharging device 7, and the like. FIG. 5 illustrates a sectional structure obtained by cutting the second shaft 23, the electrical discharging device 7, and the cover member 44 in a virtual plane perpendicular to the axial direction. In FIGS. 4 and 5, the reference numeral Dv denotes a vertical direction, and the reference numeral Dh denotes a horizontal direction. In the vertical direction Dv, the direction from the lower side to the upper side in the drawing is the vertically upper side, and the direction from the upper side to the lower side in the drawing is the vertically lower side. In FIGS. 4 and 5, the axial direction, the vertical direction Dv, and the horizontal direction Dh are perpendicular to each other.

FIGS. 7 to 14 are conceptual diagrams illustrating first to eighth arrangement examples of the through hole 443, the tubular portion 444, and the filter 445, respectively. Note that FIGS. 7 to 14 are merely the conceptual diagrams, and a layout and a dimension of each unit are not necessarily identical to those of each unit of the actual motor 100. Each of FIGS. 7 to 14 corresponds to a portion II surrounded by a broken line in FIG. 1.

The through hole 443 connects the accommodation space 440 and the outside thereof. The housing 4 has the through hole 443. In the present embodiment, the through hole 443 is disposed in the first cover portion 441 (see, for example, FIGS. 2 and 4 to 9). However, the arrangement of the through holes 443 is not limited to the example of the present embodiment. The through hole 443 may be disposed in the second cover portion 442 (see, for example, FIG. 10). The through hole 443 may be disposed only in the plate portion 433 (for example, see FIGS. 11 and 12), or may be disposed in both the plate portion 433 and the cover member 44 (for example, see FIG. 13). That is, the through hole 443 may be disposed in at least one of the plate portion 433 and the cover member 44.

The accommodation space 440 accommodating the electrical discharging device 7 is connected to the outside through the through hole 443. Since the accommodation space 440 is connected to the outside through the through hole 443, it is possible to prevent a change in the internal pressure of the accommodation space 440 due to a temperature change or the like. Therefore, it is possible to eliminate the pressure difference between the inside and the outside of the accommodation space 440 in which the electrical discharging device 7 is accommodated.

The accommodation space 440 is connected to the outside via the through hole 443 and the filter 445. The housing 4 accommodates the filter 445. Thus, it is possible to eliminate the pressure difference between the inside and the outside of the accommodation space 440 while preventing the wear debris of the conductive member 71 generated from the electrical discharging device inside the accommodation space 440 from being discharged to the outside of the accommodation space 440. In addition, entry of foreign matter from the outside to the inside of the accommodation space 440 can also be prevented.

Figure 9:
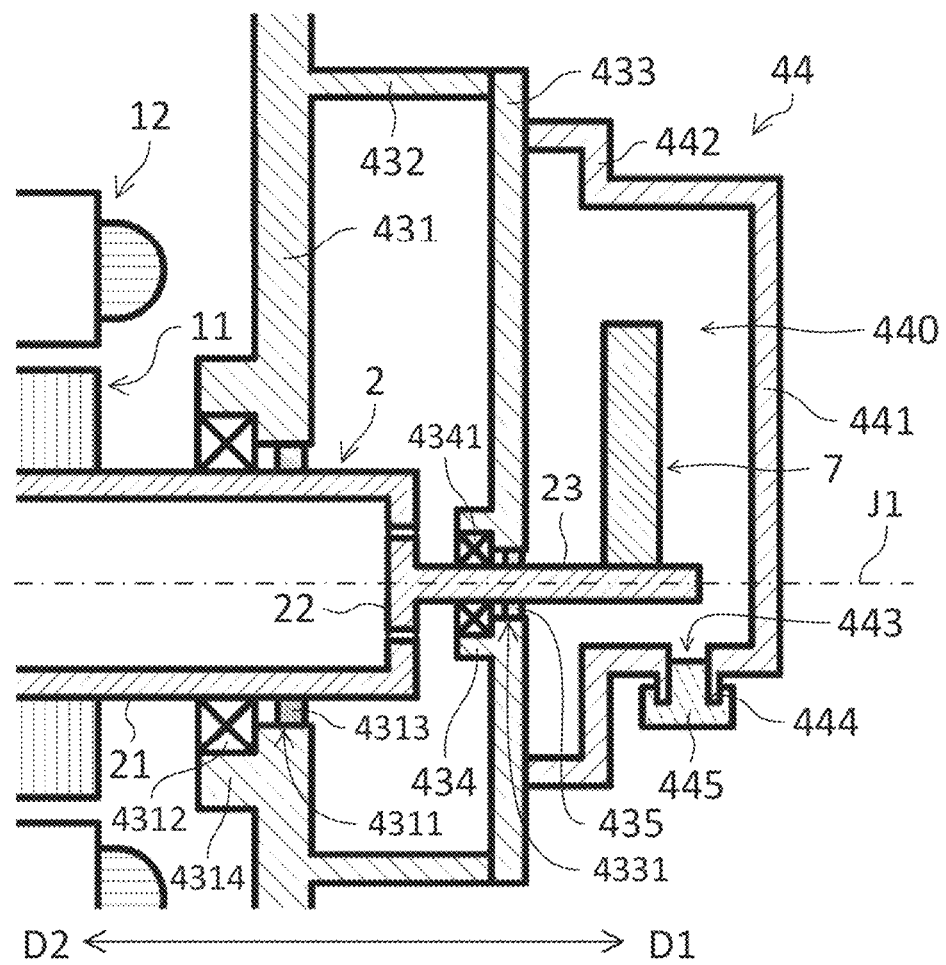
FIG. 9 is a conceptual diagram illustrating a third arrangement example of the through hole, the tubular portion, and the filter.
Figure 10:
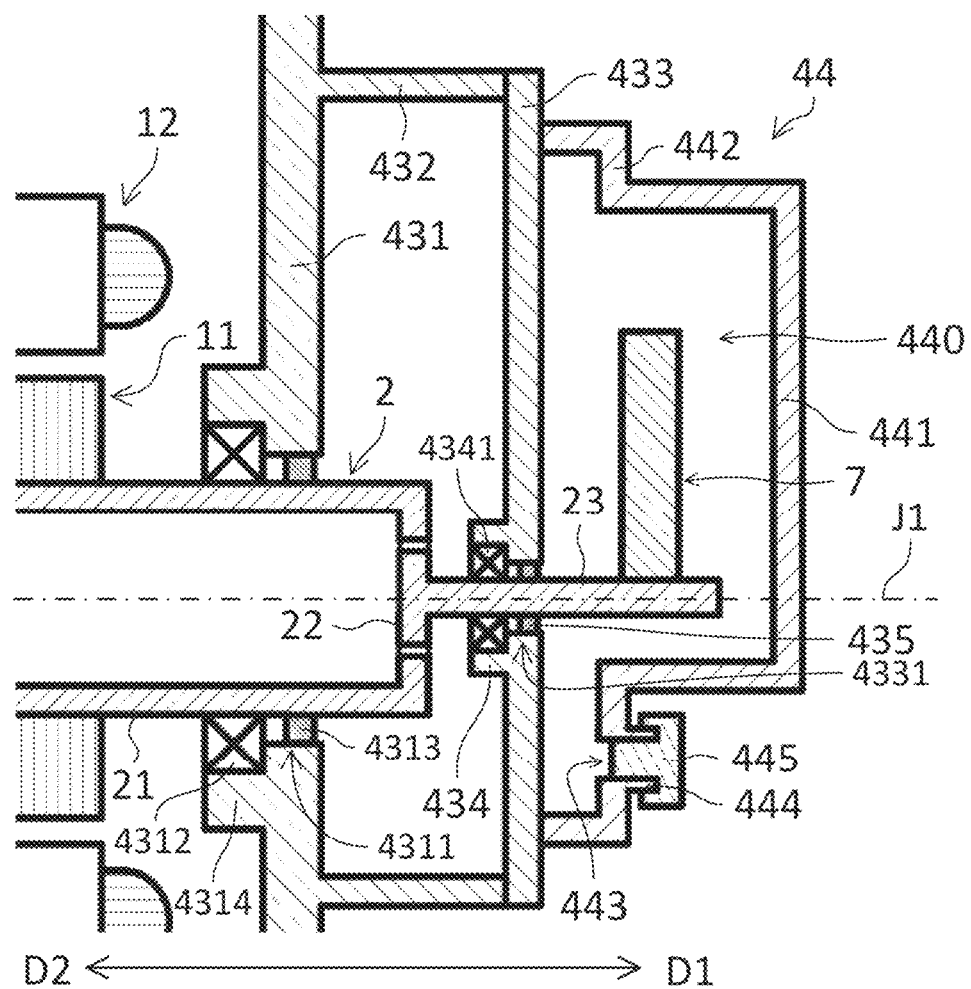
FIG. 10 is a conceptual diagram illustrating a fourth arrangement example of the through hole, the tubular portion, and the filter.
Figure 11:
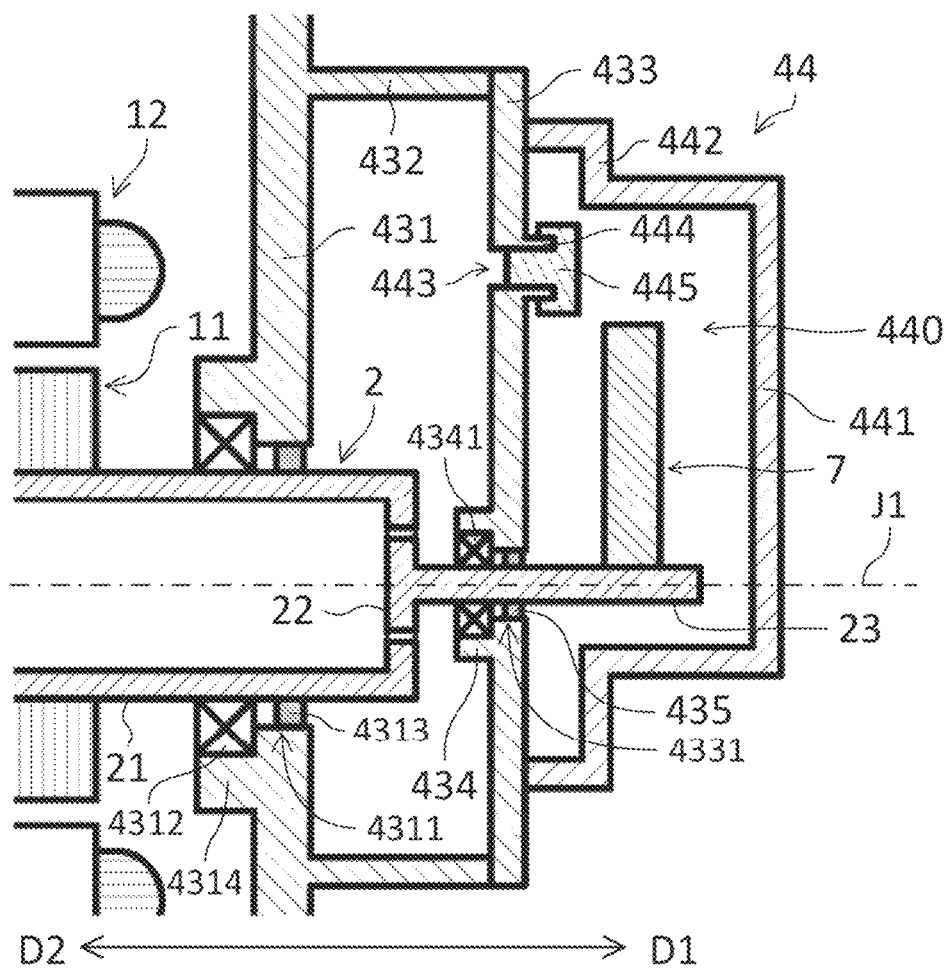
FIG. 11 is a conceptual diagram illustrating a fifth arrangement example of the through hole, the tubular portion, and the filter.
Figure 12:
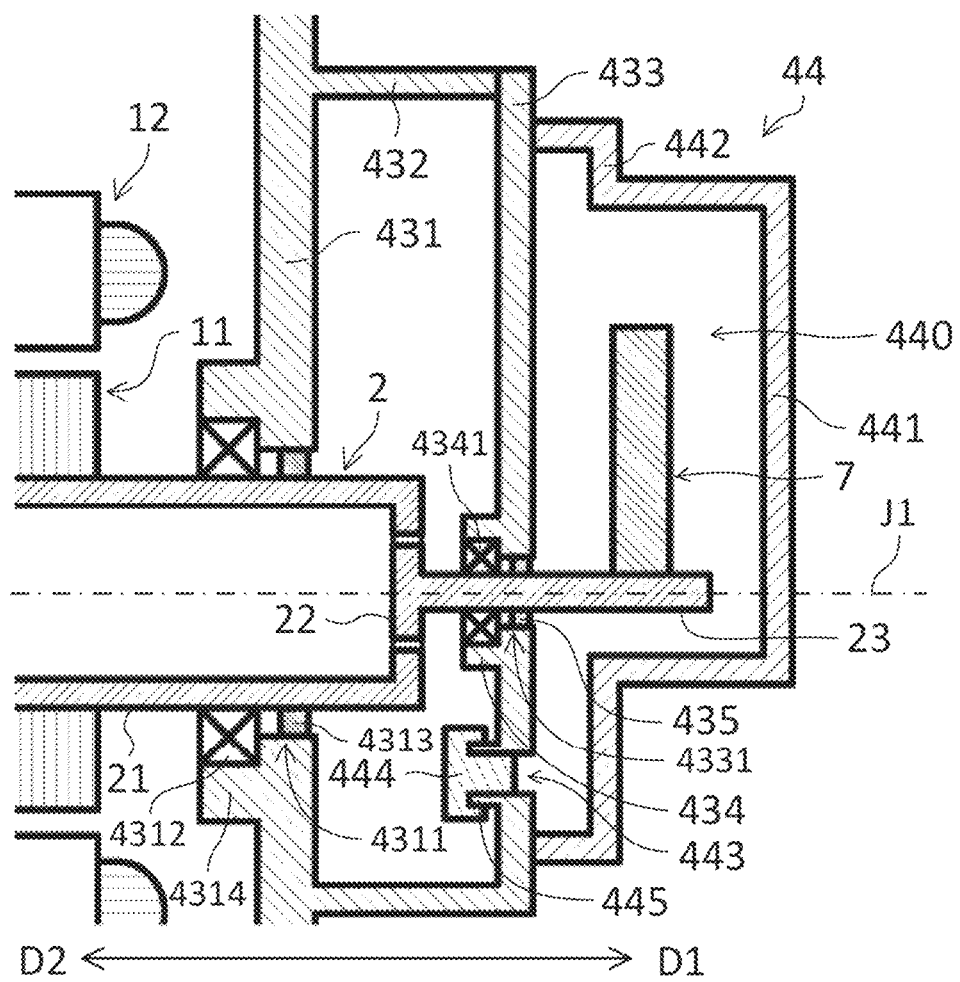
FIG. 12 is a conceptual diagram illustrating a sixth arrangement example of the through hole, the tubular portion, and the filter.

The through hole 443 extends in the axial direction in the present embodiment. However, the present invention is not limited to this example, and the through hole 443 may extend in a direction other than the axial direction, for example, may extend in the radial direction as illustrated in FIG. 9.

As illustrated in FIGS. 10 to 13, the through hole 443 may overlap the second cover portion 442 when viewed from the axial direction. Specifically, the through hole 443 may be disposed in the second cover portion 442 (see FIG. 10). In addition, the through hole 443 may be disposed in the plate portion 433 and may face the second cover portion 442 in the axial direction (see FIGS. 11 to 13). Thus, the position of the through hole 443 can be further moved away from the contact portion between the second shaft 23 of the shaft 2 and the electrical discharging device 7 in the radial direction. Therefore, wear debris generated at the contact portion is less likely to reach the through hole 443. Therefore, wear debris is less likely to be discharged to the outside of the accommodation space 440. Furthermore, when the accommodation space 440 is connected to the outside through the filter 445, clogging of the filter 445 due to wear debris reaching the through hole 443 can be suppressed. However, these examples do not exclude a configuration in which the through hole 443 is disposed in the plate portion 433 and axially faces the first cover portion 441.

Preferably, the through hole 443 is disposed on the vertically upper side with respect to the contact portion between the second shaft 23 of the shaft 2 and the electrical discharging device 7 (see FIGS. 4 and 5). The wear debris generated at the contact portion described above easily drops vertically downward by gravity. Therefore, by disposing the through hole 443 on the vertically upper side with respect to the above-described contact portion, it is possible to suppress wear debris from being discharged to the outside of the accommodation space 440 through the through hole 443. Note that this example does not exclude a configuration in which the through hole 443 is not disposed on the vertically upper side with respect to the above-described contact portion.

In the present embodiment, the electrical discharging device 7 is disposed on the opposite side of the through hole 443 across the contact portion between the second shaft 23 of the shaft 2 and the electrical discharging device 7 in the direction perpendicular to the axial direction and parallel to the horizontal direction Dh when viewed in the vertical direction Dv (see FIGS. 4 and 5). The wear debris generated at the contact portion may move toward the through hole 443 along the flow of air generated by the pressure difference between the inside and the outside of the accommodation space 440. By disposing the electrical discharging device 7 at a position away from between the through hole 443 and the contact portion when viewed from the axial direction, it is possible to make the electrical discharging device 7 less likely to be exposed to wear debris moving toward the through hole 443.

Figure 6:
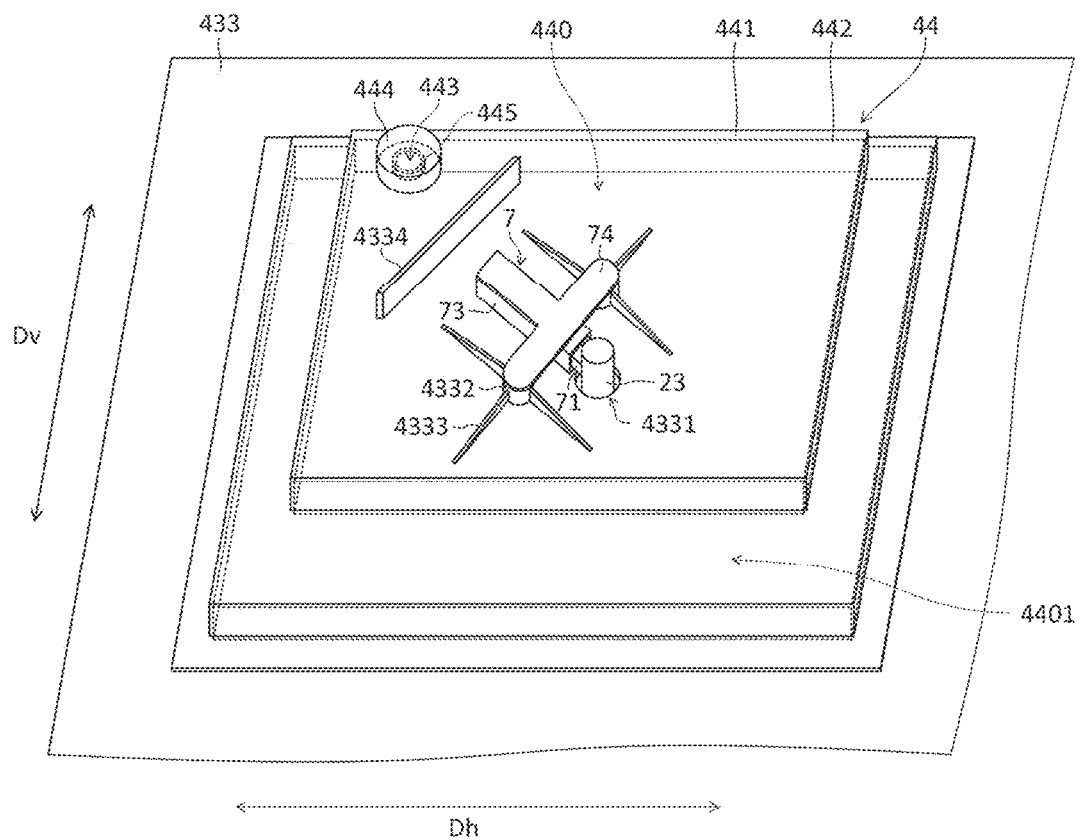
FIG. 6 is a perspective view illustrating another configuration example of the cover member and the inside of the cover member.
Figure 7:
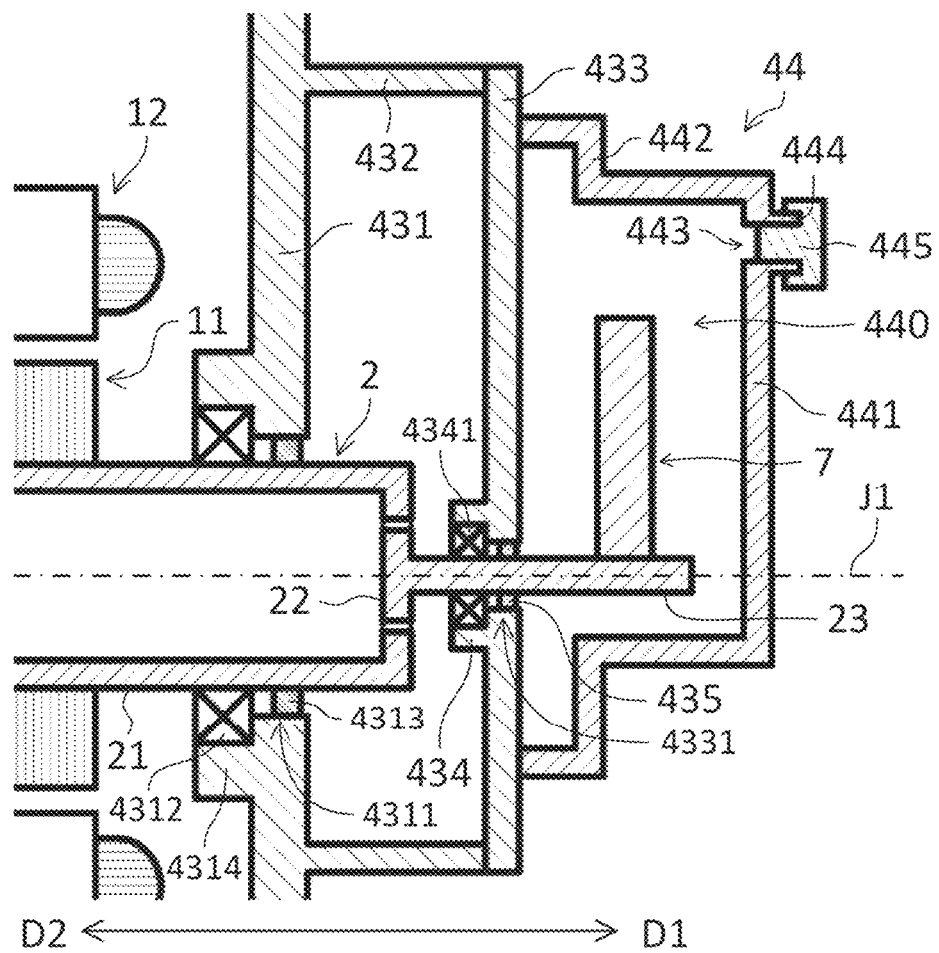
FIG. 7 is a conceptual diagram illustrating a first arrangement example of a through hole, a tubular portion, and a filter.

Note that this example does not exclude a configuration in which the electrical discharging device 7 is not disposed on the opposite side of the through hole 443 across the above-described contact portion in the direction perpendicular to the axial direction and parallel to the horizontal direction Dh when viewed from the vertical direction Dv. For example, as illustrated in FIG. 6, the electrical discharging device 7 may be disposed on the through hole 443 side with respect to the contact portion described above. At this time, the electrical discharging device 7 may be disposed between the contact portion of the shaft 2 and the electrical discharging device 7 and the through hole 443 in a direction perpendicular to the axial direction and parallel to the horizontal direction Dh when viewed from the vertical direction Dv. By disposing the electrical discharging device 7 between the contact portion and the through hole 443, the through hole 443 can be largely separated from the contact portion with the electrical discharging device 7 brought close to the through hole 443. Therefore, while the through hole 443 and the electrical discharging device 7 are compactly disposed, the wear debris generated at the contact portion can be made difficult to move toward the through hole 443.

Preferably, as in the present embodiment, the wall portion 4334 is disposed between the second shaft 23 of the shaft 2 and the through hole 443 when viewed in the axial direction (see FIGS. 4 to 6). The housing 4 includes the wall portion 4334. Specifically, the wall portion 4334 protrudes from the plate portion 433 on the one axial side D1. However, the present invention is not limited to this example, and the wall portion 4334 may protrude from the cover member 44 on the other axial side D2. That is, the wall portion 4334 protrudes from one of the plate portion 433 and the cover member 44 to the other. The wall portion 4334 is perpendicular to the axial direction and extends in a direction intersecting a direction from one of the second shaft 23 of the shaft 2 and the through hole 443 toward the other. By disposing the wall portion 4334 between the through hole 443 and the second shaft 23, wear debris generated at the contact portion between the second shaft 23 and the electrical discharging device 7 is less likely to move toward the through hole 443.

Therefore, wear debris is less likely to be discharged to the outside of the accommodation space 440 through the through hole 443. The example of the present embodiment does not exclude a configuration in which the wall portion 4334 is not disposed between the through hole 443 and the second shaft 23. For example, the wall portion 4334 may be omitted.

The tubular portion 444 extends from the outer edge portion of the through hole 443. The housing 4 includes the tubular portion 444. The inside of the tubular portion 444 is connected to the through hole 443.

In the present embodiment, the tubular portion 444 is disposed in the first cover portion 441. Furthermore, the tubular portion 444 is disposed outside the accommodation space 440 and extends on the one axial side D1 from the outer edge portion of the through hole 443 (see, for example, FIG. 7). However, the arrangement of the tubular portion 444 is not limited to this example.

Figure 8:
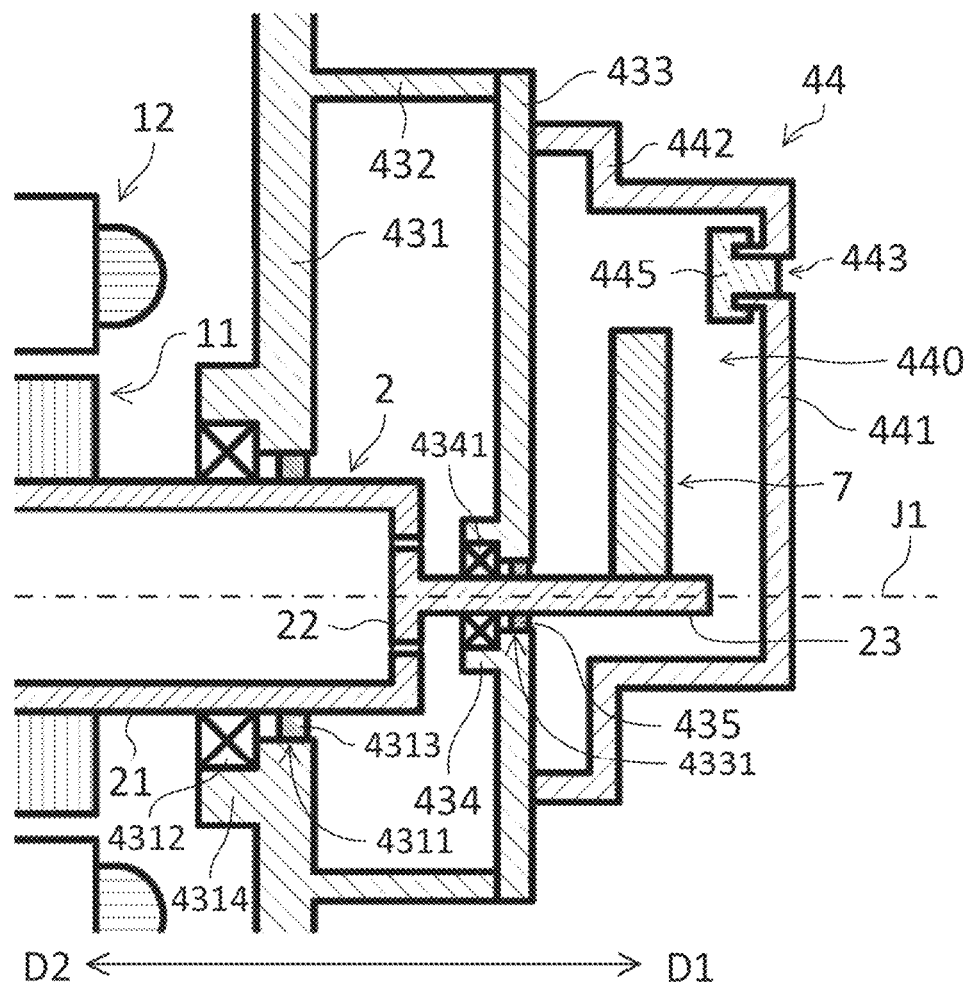
FIG. 8 is a conceptual diagram illustrating a second arrangement example of the through hole, the tubular portion, and the filter.

For example, the tubular portion 444 may be arranged inside the accommodation space 440 and may extend on the other axial side D2 from the outer edge portion of the through hole 443 disposed in the first cover portion 441 (see, for example, FIG. 8).

When the through hole 443 extends in the radial direction, the tubular portion 444 may extend radially outward from the outer edge portion of the through hole 443 disposed in the first cover portion 441 (see FIG. 9), or may extend radially inward from the outer edge portion of the through hole 443.

The tubular portion 444 may be disposed in the second cover portion 442. At this time, the tubular portion 444 may be disposed outside the accommodation space 440 and may extend on the one axial side D1 from the outer edge portion of the through hole 443 disposed in the second cover portion 442 (see, for example, FIG. 10).

The tubular portion 444 may be disposed in the plate portion 433. At this time, the tubular portion 444 may be arranged inside the accommodation space 440 and may extend on the one axial side D1 from the outer edge portion of the through hole 443 disposed in the plate portion 433 (see, for example, FIG. 11). Alternatively, the tubular portion 444 may be disposed outside the accommodation space 440 and may extend on the other axial side D2 from the outer edge portion of the through hole 443 disposed in the plate portion 433 (see, for example, FIG. 12).

Figure 13:
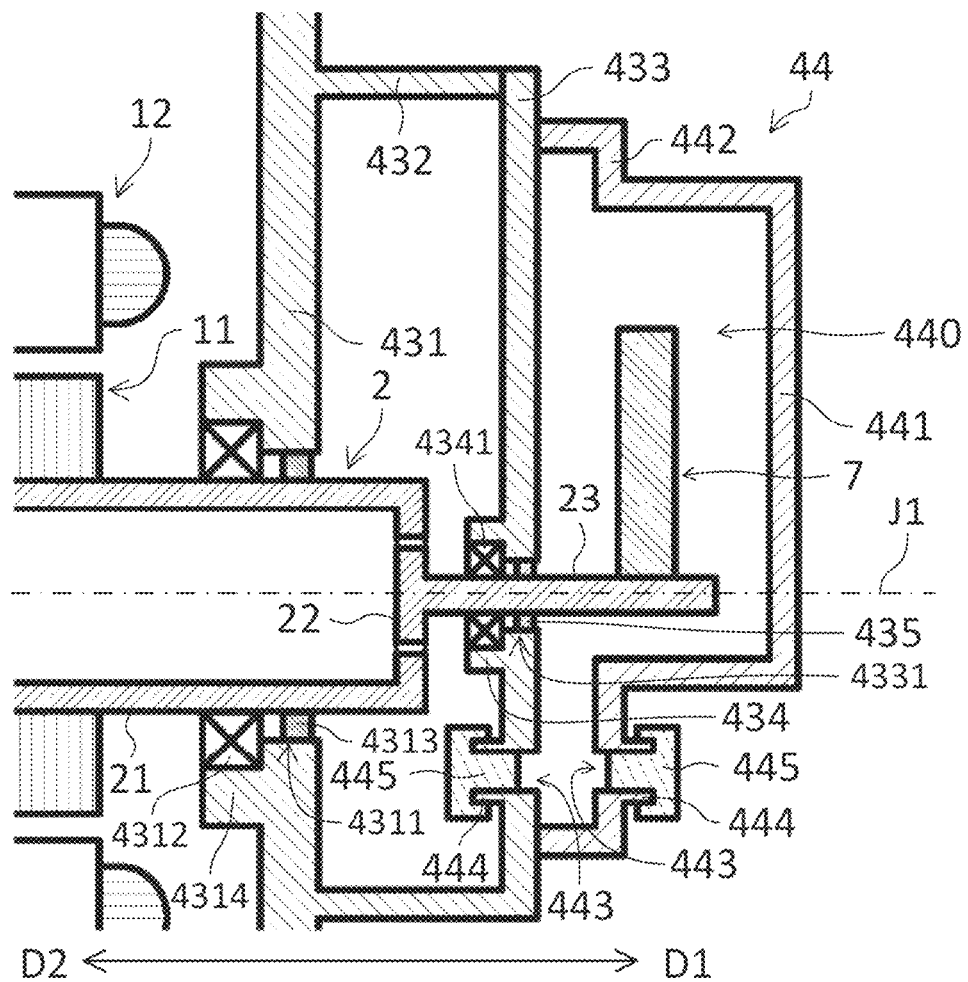
FIG. 13 is a conceptual diagram illustrating a seventh arrangement example of the through hole, the tubular portion, and the filter.
Figure 14:
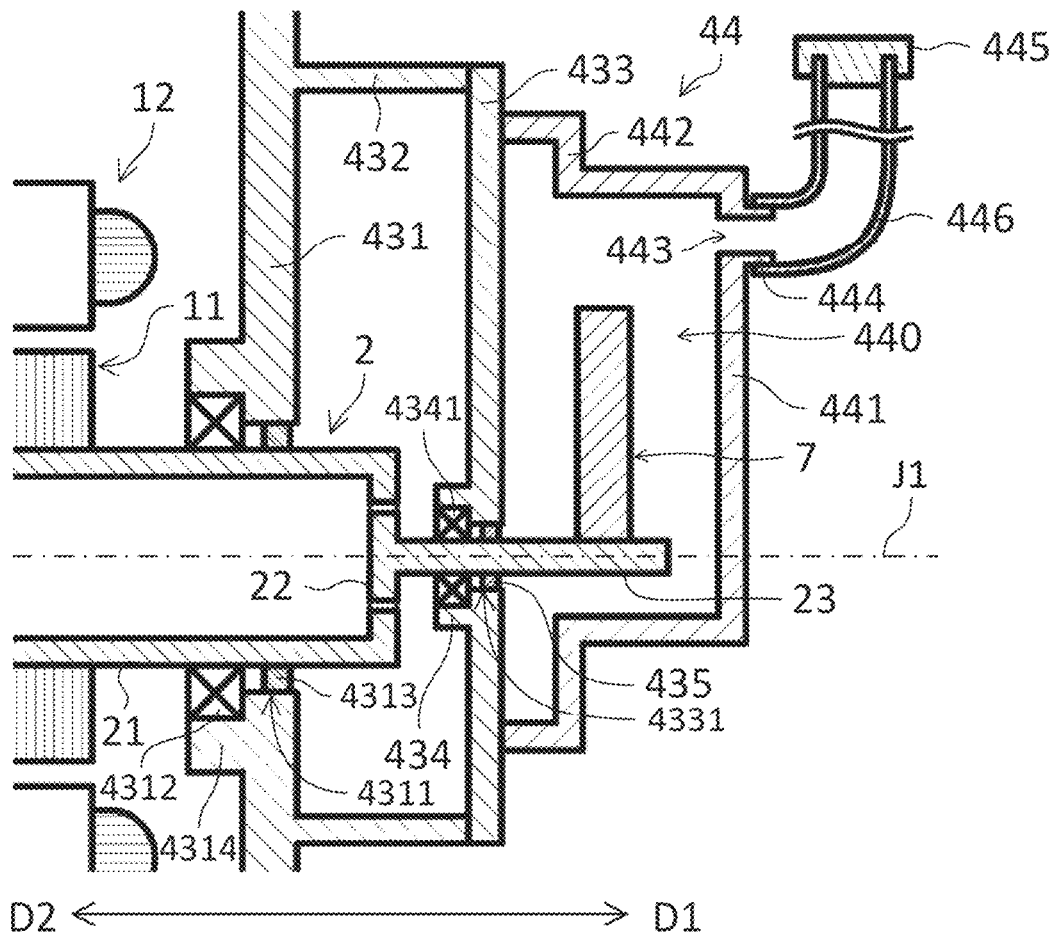
FIG. 14 is a conceptual diagram illustrating an eighth arrangement example of the through hole, the tubular portion, and the filter.

Further, the tubular portion 444 may be disposed in both the plate portion 433 and the cover member 44 (see, for example, FIG. 13).

Next, in the present embodiment, the filter 445 is disposed in the tubular portion 444. Thus, the filter 445 can be easily disposed as compared with the case where the filter 445 is disposed inside the through hole 443.

Further, in the present embodiment, the filter 445 is disposed at the tip of the tubular portion 444. Thus, the filter 445 can be disposed more easily.

However, the arrangement of the filter 445 is not limited to the above example. For example, the filter 445 may be disposed inside the through hole 443. In addition, the filter 445 may be attached to the other end of a pipe member 446 such as a flexible hose or a pipe whose one end is connected to the tip of the tubular portion 444 (see FIG. 14).

The second housing tubular portion 45 has a tubular shape that extends in the axial direction. The power transmission device 3 is disposed inside the second housing tubular portion 45. The one axial end portion of the second housing tubular portion 45 is connected to the side plate portion 42 and covered with the side plate portion 42.

The gear lid portion 46 extends in a direction intersecting the first rotation axis J1 and is detachably attached to one axial end portion of the second housing tubular portion 45. In the present embodiment, the second housing tubular portion 45 and the gear lid portion 46 are different parts of a single member. However, the present invention is not limited to this example, and the second housing tubular portion 45 and the gear lid portion 46 may be separate members. Further, the attachment of the gear lid portion 46 to the second housing tubular portion 45 may be, for example, fixing with a screw, but is not limited thereto, and a method of firmly fixing the gear lid portion 46 to the second housing tubular portion 45, such as screwing or press-fitting, can be widely adopted. As a result, the gear lid portion 46 can be brought into close contact with one axial end portion of the second housing tubular portion 45.

The gear lid portion 46 includes a second output shaft through hole 460. The center of the second output shaft through hole 460 coincides with a third rotation axis J3. The output shaft Ds is inserted into the second output shaft through hole 460. An oil seal (not illustrated) is disposed in a gap between the output shaft Ds on the other side and the second output shaft through hole 460.

The gear lid portion 46 further includes bearing holding portions 461, 462, and 463. The bearing holding portions 461, 462, and 463 are disposed in the other axial end surface of the gear lid portion 46 in the gear portion accommodation space 402. The bearing holding portion 461 holds the bearing 4611. The bearing holding portion 462 holds the second intermediate bearing 4621. The bearing holding portion 463 is disposed along the outer edge portion of the other axial end portion of the second output shaft through hole 460 and holds a second output bearing 4631.

The gear lid portion 46 includes the tray portion 464 and the oil passage 465. The tray portion 464 is disposed in one axial end surface of the gear lid portion 46 and has a recess recessed vertically downward. The tray portion 464 can store the fluid F scraped up by the ring gear 321. The oil passage 465 is a passage for the fluid F and connects the tray portion 464 and the inlet 213 of the shaft 2. The fluid F stored in the tray portion 464 is supplied to the oil passage 465 and flows into the hollow portion 211 from the inlet 213 at the other axial end portion of the shaft 2.

Next, the fluid circulation portion 6 will be described. The fluid circulation portion 6 includes a pipe portion 61, a pump 62, a cooler 63, and a reservoir 64.

The pipe portion 61 connects the pump 62 and the reservoir 64 disposed inside the first housing tubular portion 41, and supplies the fluid F to the reservoir 64. The pump 62 sucks the fluid F stored in the lower region of the gear portion accommodation space 402. The pump 62 is an electric pump, but is not limited thereto. For example, a part of the power of the shaft 2 of the motor 100 may be used for driving.

The cooler 63 is disposed between the pump 62 and the reservoir 64 of the pipe portion 61. That is, the fluid F sucked by the pump 62 passes through the cooler 63 via the pipe portion 61 and then is sent to the reservoir 64. For example, a refrigerant such as water supplied from the outside is supplied to the cooler 63. The cooler 63 exchanges heat between the refrigerant and the fluid F to lower the temperature of the fluid F.

The reservoir 64 is a tray disposed on the vertically upper side with respect to the stator 12 inside the motor accommodation space 401. A dropping hole is formed in a bottom portion of the reservoir 64, and the motor unit 1 is cooled by dropping the fluid F from the dropping hole. The dropping hole is formed, for example, at an upper portion of the coil end 1221 of the coil portion 122 of the stator 12, and the coil portion 122 is cooled by the fluid F.

Next, a modification of the embodiment will be described with reference to FIGS. 15 and 16. Hereinafter, the configurations different from the above-described embodiment will be described. Further, the same components as those in the above-described embodiment are designated by the same reference signs, and the description thereof may be omitted.

Figure 15:
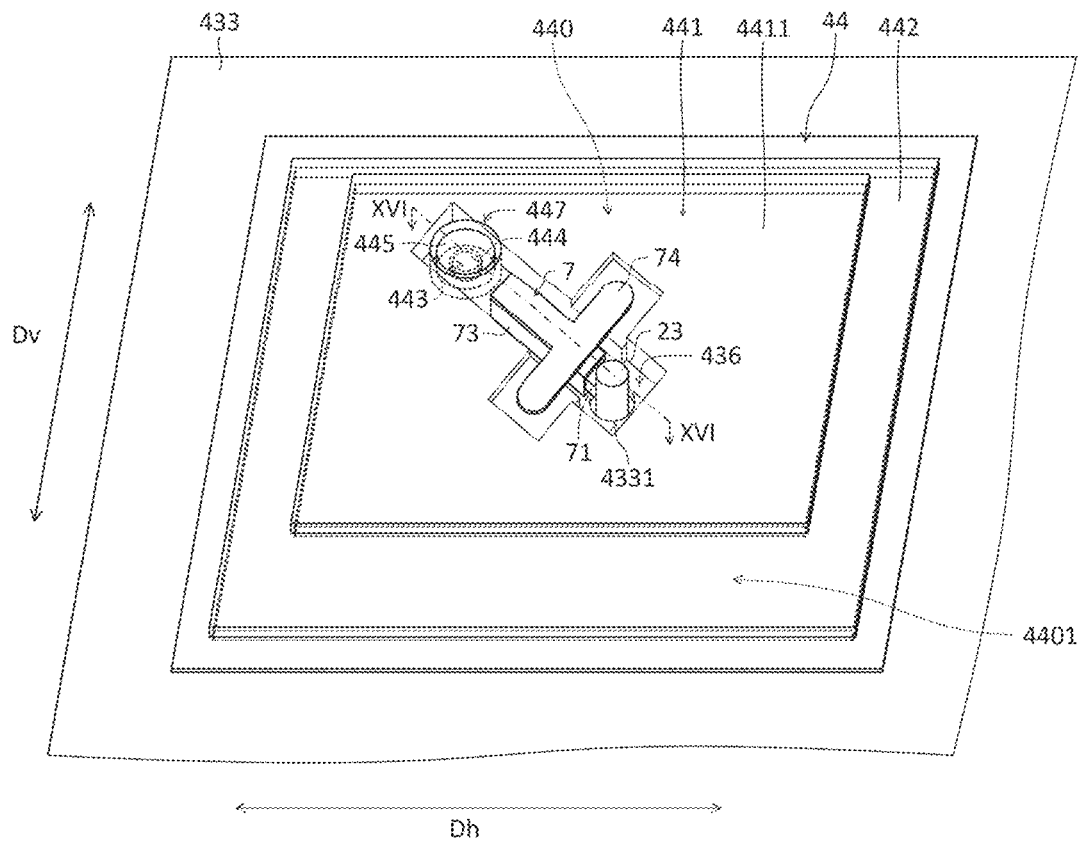
FIG. 15 is a perspective view illustrating a configuration example of a cover member and an inside of a cover member in a modification.

FIG. 15 is a perspective view illustrating a configuration example of the cover member 44 and an inside thereof in a modification. FIG. 16 is a conceptual diagram illustrating an enlarged configuration example of a main part of the motor 100 according to the modification. In FIG. 15, the cover member 44 is displayed in a transparent manner for easy viewing of the arrangement of the second shaft 23, the electrical discharging device 7, and the like. In FIG. 15, the reference numeral Dv denotes a vertical direction, and the reference numeral Dh denotes a horizontal direction. In the vertical direction Dv, the direction from the lower side to the upper side in the drawing is the vertically upper side, and the direction from the upper side to the lower side in the drawing is the vertically lower side. In FIG. 15, the axial direction, the vertical direction Dv, and the horizontal direction Dh are perpendicular to each other. FIG. 16 illustrates a sectional structure of the main part of the motor 100 taken along a virtual plane including the alternate long and short dash line XVI-XVI in FIG. 15 and the first rotation axis J1 and parallel to the axial direction.

In the modification, the cover member 44 has a first recess 447. The first recess 447 is recessed from the plate portion 4411 on the other axial side D2. That is, the first recess 447 is disposed in the first cover portion 441 in the present embodiment. However, the present invention is not limited to this example, and the first recess 447 may be disposed in the second cover portion 442. At least one through hole 443 is disposed in the first recess 447. In the present embodiment, the through hole 443 is disposed on the bottom surface of the first recess 447 facing the one axial side D1. At least a part of the filter 445 covering the through hole 443 is accommodated in the first recess 447. That is, at least a part of the filter 445 covering the through hole 443 of the first recess 447 is disposed on the other axial side D2 with respect to the plate portion 4411. Thus, the filter 445 covering the through hole 443 of the first recess 447 can be disposed on the other axial side D2. Therefore, it is possible to prevent an increase in the axial size of the motor 100 due to the arrangement of the filter 445.

At least a part of the filter 445 overlaps the electrical discharging device 7 when viewed from the radial direction. That is, the axial position of at least a part of the filter 445 described above is the same as that of the electrical discharging device 7. Thus, since the filter 445 and the plate portion 4411 can be disposed closer to the other axial side D2, the axial size of the motor 100 can be further reduced.

The motor lid portion 43 further includes a second recess 436. In other words, the housing 4 has the second recess 436. The second recess 436 is disposed on the one axial side D1 of the plate portion 433 and is recessed on the other axial side D2. At least a part of the electrical discharging device 7 is accommodated in the second recess 436. By disposing at least a part of the electrical discharging device 7 in the second recess 436 disposed on the one axial side D1 of the plate portion 433, the electrical discharging device 7 can be disposed on the other axial side D2. Therefore, the axial size of the motor 100 can be reduced and further downsized.

The second recess 436 accommodates at least a part of the filter 445 described above. Thus, the electrical discharging device 7 can be disposed closer to the other axial side D2. Therefore, the axial size of the motor 100 can be reduced and further downsized.

Figure 16:
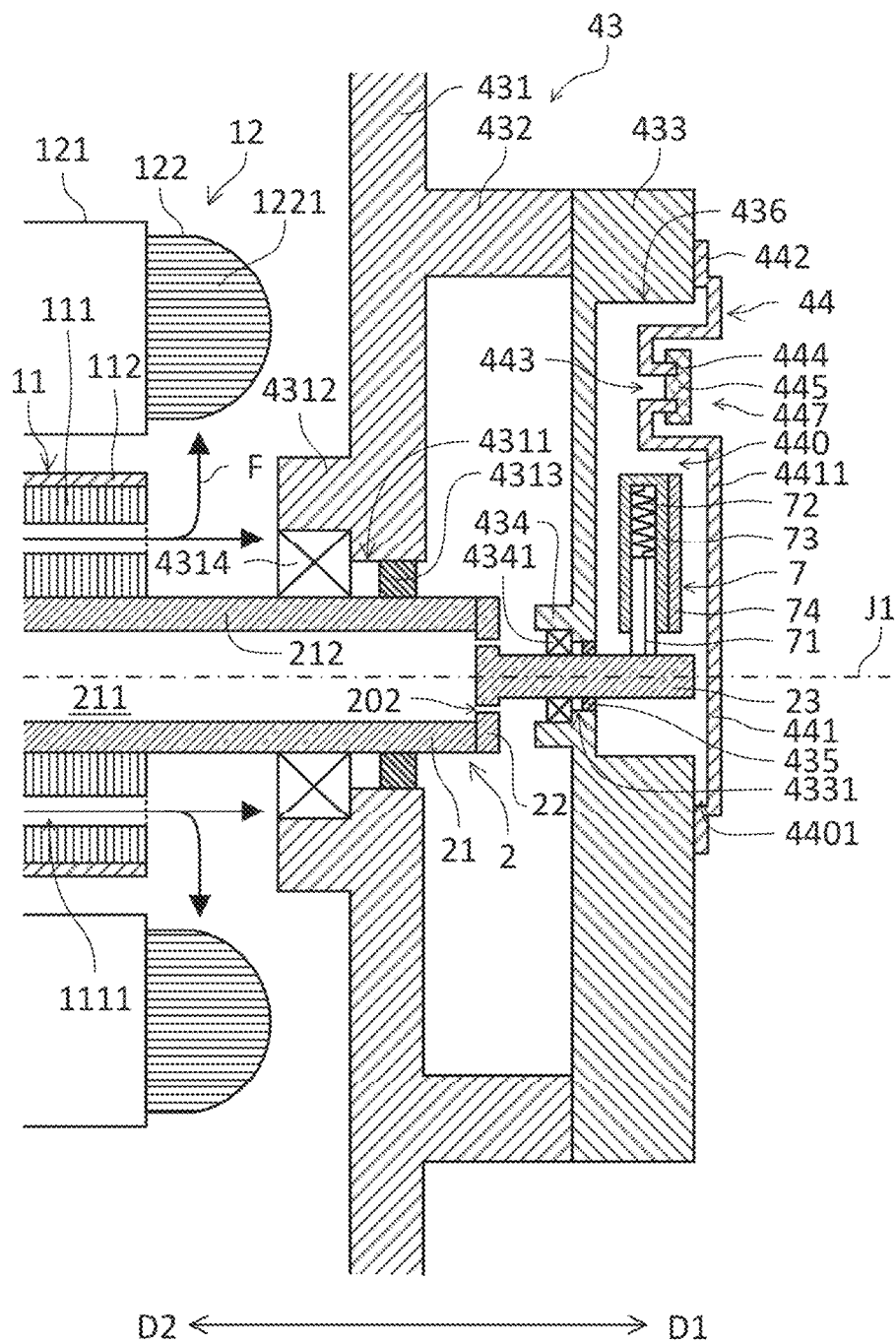
FIG. 16 is a conceptual diagram illustrating an enlarged configuration example of a main part of a motor according to a modification.

In FIGS. 15 and 16, the electrical discharging device 7 is disposed between the second shaft 23 and the through hole 443 and the filter 445. More specifically, the electrical discharging device 7 is disposed between the contact portion of the shaft 2 and the electrical discharging device 7 and the through hole 443 in a direction perpendicular to the axial direction and parallel to the horizontal direction Dh when viewed from the vertical direction Dv. However, these arrangements are not limited to the examples of FIGS. 15 and 16. For example, the electrical discharging device 7 may be disposed on the opposite side of the through hole 443 and the filter 445 across the contact portion between the second shaft 23 of the shaft 2 and the electrical discharging device 7 (see, for example, FIGS. 4 and 5).

The embodiment of the present invention has been described above. Note that, the scope of the present invention is not limited to the above-described embodiment. The present invention can be implemented by making various modifications to the above-described embodiment without departing from the gist of the invention. In addition, the matters described in the above-described embodiment can be discretionarily combined together as appropriate within a range where no inconsistency occurs.

The present invention is useful for a device for grounding a shaft.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a shaft extending in an axial direction along a rotation axis;
a rotor supported by the shaft and rotatable together with the shaft;
a stator disposed radially outward of the rotor;
a housing accommodating the rotor and the stator; and
an electrical discharging device electrically connecting the shaft and the housing,
wherein the housing includes:
a plate portion which has an opening through which one axial end portion of the shaft is inserted and expands in the radial direction;
a cover member that is disposed in one axial end surface of the plate portion and covers the electrical discharging device;
a seal member that is disposed between the shaft and the plate in the opening; and
a through hole that is disposed in at least one of the plate portion and the cover member,
the electrical discharging device is accommodated in an accommodation space surrounded by the plate portion and the cover member, and
the accommodation space is connected to an outside through the through hole.

2. The motor according to claim 1, wherein
the housing further includes a filter, and
the accommodation space is connected to an outside via the through hole and the filter.

3. The motor according to claim 2, wherein
the housing further includes a tubular portion extending from an outer edge portion of the through hole, and
the filter is disposed in the tubular portion.

4. The motor according to claim 3, wherein the filter is disposed in a tip portion of the tubular portion.

5. The motor according to claim 2, wherein
the cover member includes:
a plate portion extending in a direction intersecting with the rotation axis; and
a first recess recessed on another axial side from the plate portion,
the at least one through hole is disposed in the first recess, and
the filter covering the through hole of the first recess is disposed on the other axial side with respect to the plate portion.

6. The motor according to claim 5, wherein at least a part of the filter overlaps the electrical discharging device when viewed from the radial direction.

7. The motor according to claim 1, wherein
the housing further includes a second recess disposed on one axial side of the plate portion and recessed on the other axial side, and
at least a part of the electrical discharging device is accommodated in the second recess.

8. The motor according to claim 2, wherein
the housing further includes a second recess disposed on one axial side of the plate portion and recessed on the other axial side,
at least a part of the electrical discharging device is accommodated in the second recess, and
the second recess accommodates at least a part of the filter.

9. The motor according to claim 1, wherein
the cover member includes:
a first cover portion that covers the electrical discharging device; and
a second cover portion that is disposed radially outward of the first cover portion, and
the second cover portion is disposed on the other axial side with respect to the first cover portion.

10. The motor according to claim 9, wherein the through hole overlaps the second cover portion when viewed from the axial direction.

11. The motor according to claim 1, wherein the through hole is disposed on a vertically upper side with respect to a contact portion between the shaft and the electrical discharging device.

12. The motor according to claim 1, wherein the electrical discharging device is disposed on an opposite side of the through hole across a contact portion between the shaft and the electrical discharging device in a direction perpendicular to the axial direction and parallel to a horizontal direction when viewed in a vertical direction.

13. The motor according to claim 1, wherein the electrical discharging device is disposed between a contact portion between the shaft and the electrical discharging device and the through hole in a direction perpendicular to the axial direction and parallel to a horizontal direction when viewed in a vertical direction.

14. The motor according to claim 1, wherein the accommodation space includes a lower space having a predetermined size disposed vertically downward from the opening.

15. The motor according to claim 1, wherein
- the housing further includes a wall portion disposed between the shaft and the through hole when viewed in the axial direction, and
- the wall portion protrudes from one of the plate portion and the cover member to the other, and extends in a direction perpendicular to the axial direction and intersecting a direction from one of the shaft and the through hole to the other.

* * * * *